VOLTAGE REGULATING SYSTEM.
APPLICATION FILED JAN. 10, 1908.

1,018,322.

Patented Feb. 20, 1912.
3 SHEETS—SHEET 1.

WITNESSES:
C. L. Belcher
Otto S. Schairer

INVENTOR
Ray P. Jackson
BY
Wesley G. Carr
ATTORNEY

R. P. JACKSON.
VOLTAGE REGULATING SYSTEM.
APPLICATION FILED JAN. 10, 1908.

1,018,322.

Patented Feb. 20, 1912.

3 SHEETS—SHEET 3.

WITNESSES:
C. L. Belcher
Otto S. Schairer.

INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

VOLTAGE-REGULATING SYSTEM.

1,018,322.  Specification of Letters Patent.  Patented Feb. 20, 1912.

Application filed January 10, 1908. Serial No. 410,233.

*To all whom it may concern:*

Be it known that I, RAY P. JACKSON, a citizen of the United States, and a resident of Wilkinsburg, in the county of Allegheny and State of Pennsylvania, have invented a new and useful Improvement in Voltage-Regulating Systems, of which the following is a specification.

My invention relates to systems of electrical distribution, and it has for its object to maintain the voltage of a circuit substantially normal regardless of variations in the amount and power factor of the load upon the circuit.

In another application, Serial No. 410,232, filed of even date herewith, I have set forth a system in which adjustment of the field strength of a generator is effected in accordance with variations in both the amount and power factor of the load upon the circuit supplied by the generator, the means employed comprising a vapor current-rectifying device and a transformer from which the rectifying device is supplied with current that is proportional in amount to the resultant of two fluxes, the one being produced by the current traversing the circuit, and the other being substantially constant in amount and phase. In the said system, however, the variations in the field strength of the generator are not effected strictly in accordance with the causes of the drop of voltage, but in the present system the transformer from which the rectifying device is supplied is so constructed and the circuits are so arranged that the field strength of the generator is adjusted substantially in proportion to the variations in the wattless component of the current traversing the circuit and also in proportion to variations in the amount of the current traversing the circuit.

Figure 1:
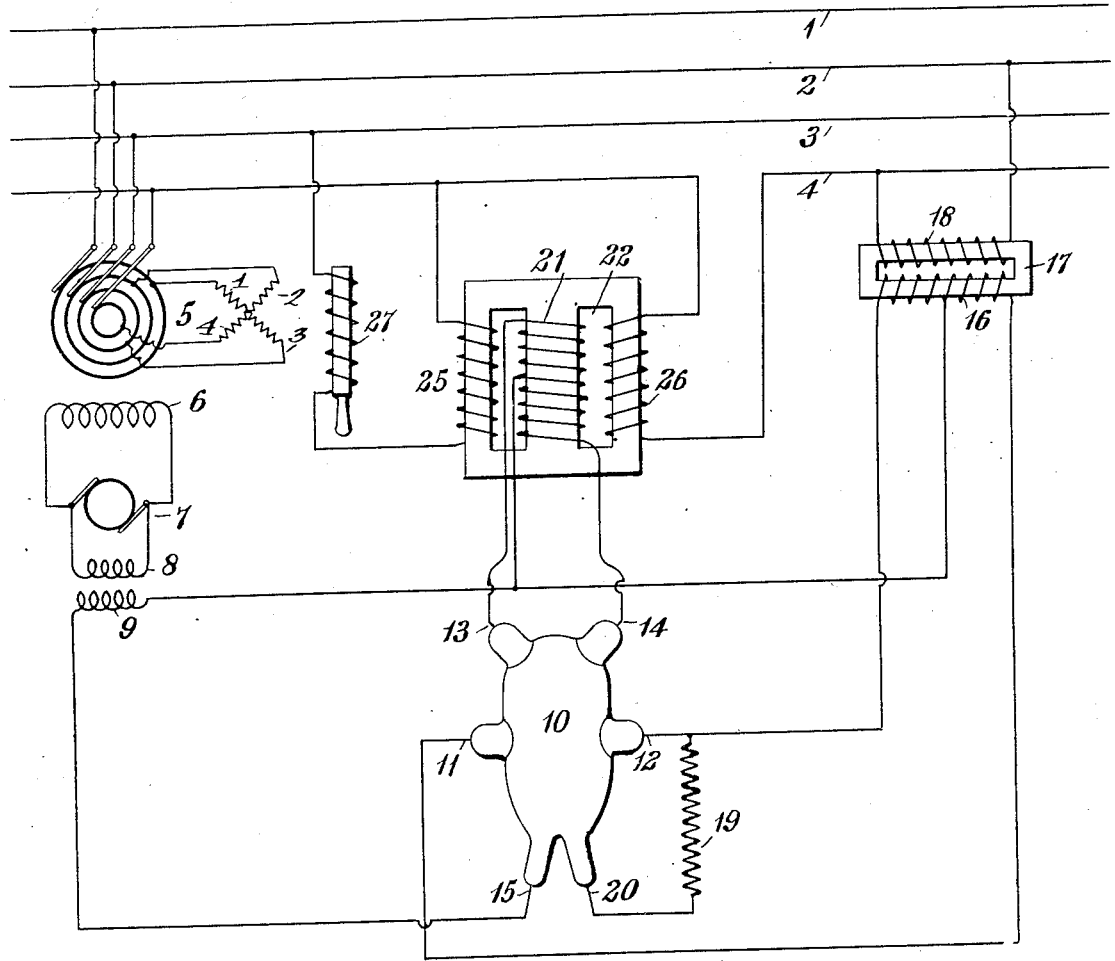
Figure 2:
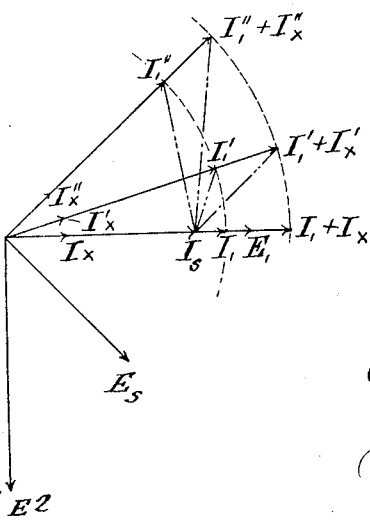
Figure 3:
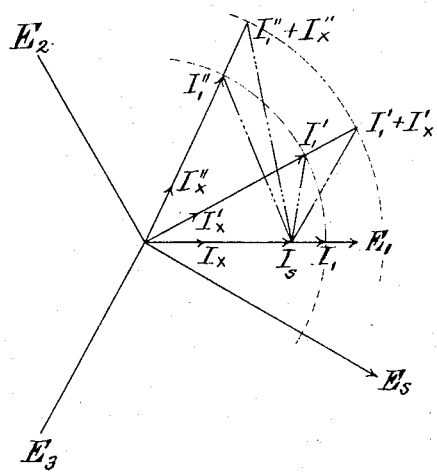
Figure 4:
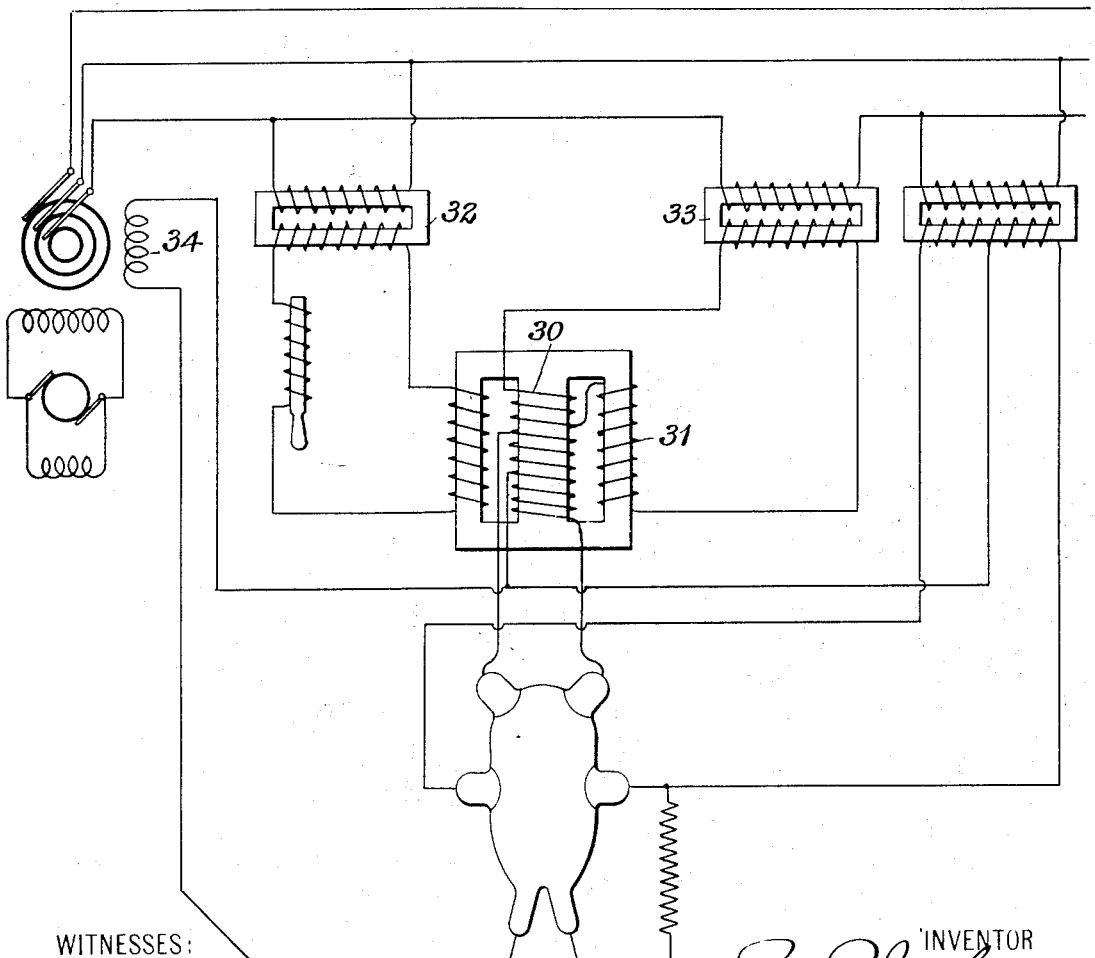
Figure 5:
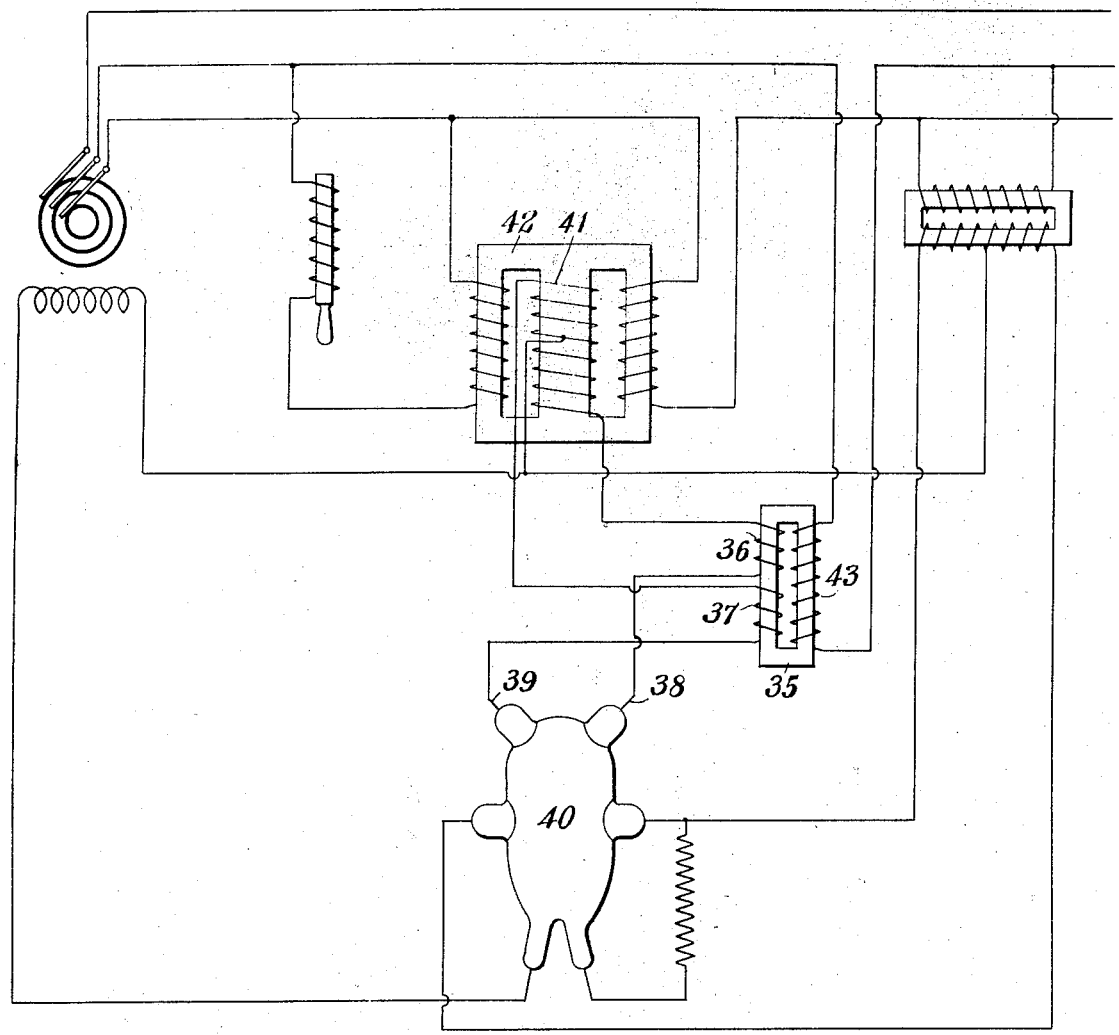
Figure 6:
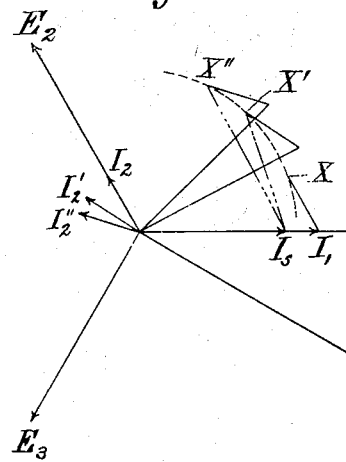

Figure 1 of the accompanying drawings is a diagrammatic view of a system of distribution embodying my invention. Figs. 2 and 3 are vector diagrams of the phase relations in systems embodying the invention. Figs. 4 and 5 are diagrammatic views of modifications of the system of Fig. 1, and Fig. 6 is a vector diagram illustrating the phase relations in the system of Fig. 5.

In Fig. 1, a two-phase system of distribution, comprising circuit conductors 1, 2, 3, and 4, is supplied from a generator 5 the field magnet winding 6 of which is supplied from an exciting generator 7 having shunt and auxiliary field magnet windings 8 and 9, respectively. Auxiliary field magnet winding 9 is supplied from a mercury-vapor or other suitable current-rectifying device 10 having two sets of alternating current terminals 11 and 12 and 13 and 14 and a direct current terminal 15, the latter being connected to one terminal of the field magnet winding 9.

Alternating current terminals 11 and 12 of the rectifier are connected to the respective terminals of the secondary winding 16 of a transformer 17, the primary winding 18 of which is connected between circuit conductors 2 and 4, a resistance 19 being connected between the terminal 12 and an auxiliary terminal 20 of the rectifier in order that the rectifying process may be started in the usual manner, by tilting the device.

The transformer 17 is employed for the purpose of insuring continuance of the rectifying process under all conditions.

Alternating current terminals 13 and 14 of the rectifier are connected, respectively, to the terminals of the secondary winding 21 of a transformer 22, the neutral or other suitable intermediate point of the winding 21, as well as a similar point of the winding 16, being connected to a terminal of the field magnet winding 9. The transformer 22 comprises, further, a magnetizable core of the shell type upon the middle leg of which the secondary winding 21 is mounted and upon the outer legs of which two primary windings 25 and 26, respectively, are mounted and arranged to produce fluxes in the same direction in the magnetic circuit. Winding 26 is connected in series with circuit conductor 4, and winding 25 is connected between circuit conductors 3 and 4 belonging to different phases of the system and in series with an inductive resistance device 27, whereby the current traversing the same is caused to lag considerably in phase behind the electromotive force derived from the circuit conductors 3 and 4, and, preferably, to such a degree that the currents traversing the windings 25 and 26 will be approximately in phase with each other when the power factor of the load upon the distributing circuit is unity.

In the operation of the system, the field strength of the exciting generator 7, and, consequently, also that of the main generator 5, will remain substantially unvaried with changes in the amount of load upon the distributing circuit when the power factor of the load is unity, because the currents traversing the windings 25 and 26 are of substantially the same phase and the fluxes produced by the said currents will traverse only the outer legs of the magnetizable core. If, however, the power factor of the load upon the circuit varies from unity, the flux produced by the winding 26 will be thrown out of phase with that produced by the winding 25, with the result that a flux approximately equal to the vectorial difference of the fluxes produced, respectively, by the windings 25 and 26 will traverse the middle leg of the magnetizable core. A current will, therefore, be induced in the secondary winding 21 which will be rectified and supplied to the field magnet winding 9. The field strength of the exciting generator, and in turn that of the main generator, is thereby increased in accordance with the change in power factor of the load upon the circuit, and this variation in the field strength will occur approximately in proportion to the variations in the regulation of the generator; i. e., to the variations in the wattless or demagnetizing component of the current traversing the main circuit. These conditions will be better understood by a consideration of Figs. 2 and 3, which are vector diagrams illustrating the phase relations at different power factors of the load, Fig. 2 illustrating the relations in a two-phase system and Fig. 3 the relations in a three-phase system. In the said diagrams, $E_1$, $E_2$, and $E_3$ are vectors representing the electromotive forces of the circuits. $E_s$ represents the electromotive force applied to the circuit of the winding 25. $I_1$, $I_1'$ and $I_1''$ represent the currents traversing the winding 26 at various power factors of the load upon the circuit. $I_s$ represents the current traversing the winding 25, which is caused, by means of the inductive resistance 27, to lag behind the electromotive force $E_s$ to such a degree as to be approximately in phase with the current $I_1$ traversing the winding 26.

As before stated, no flux is caused to traverse the middle leg of the magnetizable core 24 when the power factor of the load upon the circuit is unity, providing, of course, that the currents $I_1$ and $I_s$ are in phase at unity power factor. However, if the current traversing the winding 26 lags behind the electromotive force $E_1$, as indicated by the vector $I_1'$, a flux will be caused to traverse the middle leg of the magnetizable core approximately proportional to the vectorial difference of the vectors $I_1'$ and $I_s$, this vectorial difference being represented by the line $I_s - I_1'$. It will be noted that, for a slight variation in the power factor of the load from unity, a very considerable change in the flux traversing the middle leg of the magnetizable core occurs, and the amount of this flux will vary nearly, or approximately, as the sine of the angle between the current and the electromotive force of the main circuit, according to which law the demagnetizing effect of the lagging current in the circuit varies; i. e., as the wattless component of the said current varies. At other than unity power factor, variations in the amount of the load upon the circuit will also cause variations in the amount of flux traversing the middle leg of the magnetizable core, the effect of which variations will be readily understood by considering different lengths of the vectors $I_s - I_1'$ and $I_s - I_1''$ in the diagrams of Figs. 2 and 3. It will be noted, from these figures, that, as the power factor of the circuit changes slightly from unity, as represented by the angle between the lines $I_1$ and $I_1''$, the flux through the winding 21 changes from zero to a value represented by the line $I_s - I_1''$. That is, the flux through the winding 21, and the current traversing the said winding, change greatly and rapidly in value with slight variations of the power factor from unity and more than in direct proportion to the variations of the power factor. On the other hand, a mere change of current in the main circuit and in the coil 26 from a value represented by $I_1'$ to $I_1' + I_x'$ causes a change in the flux passing through the coil 21 from a value represented by the line $I_s - I_1'$ to a value represented by the line $I_s - I_1' + I_x'$. This change is not as rapid or as great as the variations caused by slight changes of power factor from unity, but is sufficient to effect the proper change of the exciter field strength to compensate for changes of load.

Because of leakage in the transformer from which the rectifying device is supplied in Fig. 1, the transformer there illustrated cannot be relied upon to cause changes in the field strength of the main generator in proportion to the changes in the amount of load upon the circuit. With the said transformer, also, changes in the amount of load at unity power factor will not effect changes in the field excitation of the main generator. In order, therefore, that variations in the amount of load may cause proportionate changes in the field excitation of the main generator at all power factors, I may prefer to employ a transformer, such as that illustrated in Fig. 4, in which an auxiliary primary winding 30 is also placed upon the middle leg of the magnetizable core and is connected in series with a primary winding 31 that is mounted upon one of the outer legs of the core and to which current is supplied that is proportional in amount to the current which traverses one of the circuit conductors. The remainder of the system of Fig. 4 is substantially like that of Fig. 1, except that, for insulation purposes, transformers 32 and 33 are interposed between the circuit and the transformer from which the rectifying device is supplied, and the rectifying device supplies an auxiliary field magnet winding 34 for the main generator, these changes being illustrative of the many modifications of which the invention is capable without departing from its spirit.

In the vector diagrams of Figs 2 and 3, the vectors $I_x$, $I_x'$ and $I_x''$ represent the currents traversing the winding 30 at various power factors, the corresponding values of the fluxes traversing the middle leg of the magnetizeble core being indicated by the vectors $I_x$, $I_s - I_1' + I_x'$ and $I_s - I_1'' + I_x''$.

As illustrated in Fig. 5, the result that is effected in the system of Fig. 4 by means of the auxiliary primary winding 30 may also be effected by means of a separate transformer 35, having two secondary windings 36 and 37, included, respectively, in series with the conductors connecting main alternating current terminals 38 and 39 of the rectifying device 40 to the extremities of secondary winding 41 of transformer 42 from which the rectifying device is supplied, primary winding 43 of the transformer 35 being included in series with one of the circuit conductors. The effect of the transformer 35 is to cause a current that is proportional in amount to the current which traverses the distributing circuit, to be combined with that induced in the secondary winding 41, these currents for various power factors of the load being illustrated in the diagram of Fig. 6 by vectors $I_2, I_2'$ and $I_2''$ and the resultant currents supplied to the rectifying device being illustrated by vectors $I_s - X$, $I_s - X'$ and $I_s - X''$. The primary winding 43 of the transformer 35 may obviously be connected in series with other conductors of the distributing circuit, if desired, the effect upon the phase relations being obvious from an inspection of Fig. 6.

I claim as my invention:

1. The combination with an electrical circuit, and a generator connected thereto, of means for adjusting the field strength of the generator approximately in proportion to variations in the wattless component of the current traversing the circuit, thereby substantially exactly compensating the field strength for varying deviations of the power factor of the circuit from unity and also substantially in proportion to the amount of said current.

2. The combination with an electrical circuit, and a generator connected thereto, of means for adjusting the field strength of the generator in accordance with variations in the vectorial difference of a flux produced by current traversing a circuit conductor and a flux that is substantially constant in amount and phase, only when the said fluxes differ in phase, and means for producing the said component fluxes.

3. The combination with an electrical circuit, and a generator connected thereto, of means for adjusting the field strength of the generator in accordance with variations in the vectorial difference of two fluxes only when the said fluxes differ in phase, and means for producing the said component fluxes.

4. The combination with an electrical circuit, and a generator connected thereto, of means for adjusting the field strength of the generator in accordance with variations in the vectorial differences of two fluxes only when the said fluxes differ in phase, the one flux varying in phase with the power factor of the circuit, and the other being substantially constant in amount and phase, and means for producing the said component fluxes.

5. The combination with an electrical circuit, and a generator connected thereto, of means for adjusting the field strength of the generator in accordance with variations in the vectorial difference of two fluxes only when the said fluxes differ in phase, the one flux varying in phase with the power factor of the circuit, and the other being substantially constant in amount and phase, and for effecting the said adjustment also in accordance with variations in the amount of current traversing the circuit, and means for producing the said component fluxes.

6. The combination with an electrical circuit, and a generator connected thereto, of a current-rectifying device supplying current for governing the field strength of the generator, and a transformer comprising a magnetizable core having three legs, primary windings upon the two outer legs to which currents are supplied that are proportional in amount, respectively, to the current traversing a circuit conductor and to the difference of potential between two of the circuit conductors, and a secondary winding located upon the middle leg of the core and connected to the rectifying device.

7. The combination with an electrical circuit, and a generator connected thereto, of a current-rectifying device supplying current for governing the field strength of the generator, and a transformer comprising a magnetizable core having three legs, primary windings upon two of the legs to which currents are supplied that are proportional in amount, respectively, to the current traversing a circuit conductor and to the difference of potential between two of the circuit conductors, a secondary winding located upon the remaining leg of the core and connected to the rectifying device, and another winding upon the latter core leg to which current is supplied that is proportional in amount to the current which traverses a circuit conductor.

8. The combination with an electrical circuit, and a generator connected thereto, of a current-rectifying device supplying current for governing the field strength of the generator, and a transformer comprising a magnetizable core having three legs, primary windings upon two of the legs to which currents are supplied that are proportional in amount, respectively, to the current traversing a circuit conductor and to the difference of potential between two of the circuit conductors, a secondary winding located upon the remaining leg of the core and connected to the rectifying device, and means for producing, in the secondary circuit of the transformer, a current that is proportional in amount to the current which traverses a circuit conductor.

In testimony whereof, I have hereunto subscribed my name this 31st day of Dec., 1907.

RAY P. JACKSON.

Witnesses:
OTTO S. SCHAIRER,
BIRNEY HINES.